May 26, 1925. 1,538,981

W. GILLINGHAM

RODENT TRAP

Filed Aug. 29, 1924

W. Gillingham
Inventor

By Clarence A. O'Brien
Attorney

Patented May 26, 1925.

1,538,981

UNITED STATES PATENT OFFICE.

WILLIAM GILLINGHAM, OF WHEELING, WEST VIRGINIA.

RODENT TRAP.

Application filed August 29, 1924. Serial No. 734,851.

*To all whom it may concern:*

Be it known that I, WILLIAM GILLINGHAM, a citizen of the United States, residing at Wheeling, in the county of Ohio and State of West Virginia, have invented certain new and useful Improvements in a Rodent Trap, of which the following is a specification.

This invention relates to an improved trap of the self and ever set type, the same especially but not necessarily, designed for entrapping rodents such as rats, squirrels, gophers and the like.

The primary object is to provide a trap of this kind which is comparatively simple in construction, practical and effective in use, capable of trapping a number of rodents at one time, and of such construction that it is comparatively inexpensive to both manufacturer and the user.

More specifically, I propose to provide a trap for the purpose specified which comprises a supporting frame for a plurality of trap doors which are trip controlled and are automatically returned to their normal positions, the device being intended to be placed upon the open top of a receptacle such as a barrel or tub containing water or the like into which the animal is dropped.

The invention embodies several details productive of features and advantages and these will become apparent from the following description and drawing.

In the accompanying drawing forming a part of this specification and in which like numerals are employed to designate like parts throughout the same.

Figure 1 represnts a top plan view of a trap constructed in accordance with the present invention.

Figure 2:
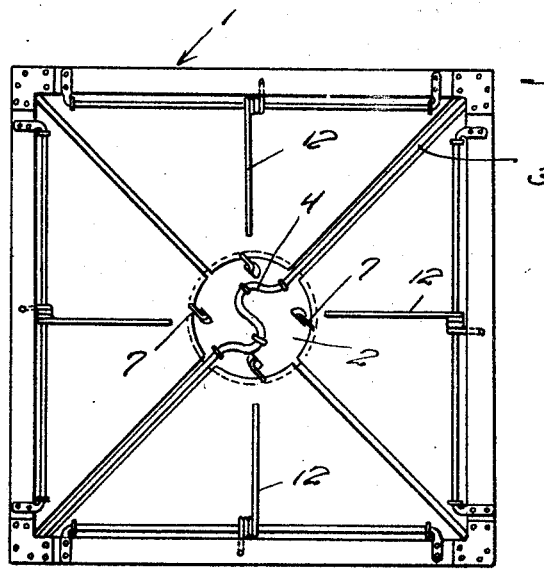
Figure 2 represents a bottom plan view thereof.
Figure 3:
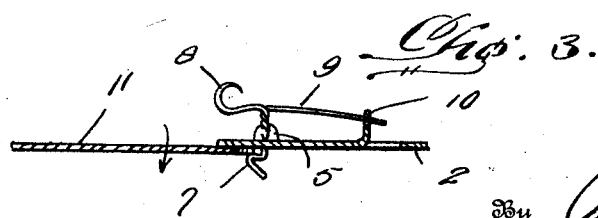
Figure 3 represents an enlarged detail sectional view taken substantially on the plane of line 3—3 of Figure 1.

Referring now to the drawing in detail it will be seen that the improved device comprises a substantially rectangular wooden frame 1 constructed of suitably braced and connected bars, disposed at the center of the frame and supported from the latter is a discular stop plate 2. In the present instance I have shown the diagonally extending metal bar 3 connected to opposed corners of the frame and bent into S-shape intermediate its ends as indicated at 4 (see Figure 2). The plate 2 is connected to the S-shaped portion of the rod through the medium of staples or the like as shown and it is thus prevented from twisting and is made comparatively rigid. This plate in addition to serving as a stop, constitutes a support for the animal actuated trip devices. In order to accommodate this the plate is provided at circumferentially spaced points with upwardly struck ears 5 provided with apertures to produce bearings. A pair of shafts 6 are journaled at their opposite ends in the bearings and the free ends of the shaft are directed downwardly through the openings left by the struck up ears. As seen more clearly in Figure 3 each end of the shaft is fashioned as indicated at 7 to provide a catch. Connected to the intermediate portion of each shaft 6 is a bait hook 8 which extends close to or beyond the margin of the plate. There are but two of these bait hooks and these are disposed at substantially diametrically opposite points. It is obvious that since the hooks are connected to the shaft 6, when the bait is pulled upon, the hooks will serve to rock the shaft and in so doing will move the catches 7 to releasing position. In order to return the parts to their normal positions, the springs 9 are provided, these being connected at their outer ends to the hooks 8 and anchored at their inner ends in an ear 10 which is struck up from the center of the aforesaid plate 2.

Cooperating with the catches 7 is a plurality of trap doors 11 which are pivotally connected in any appropriate manner to the side bars of the frame 1. By preference, the trap doors are substantially triangular in general outline and have their inner apices disposed beneath the stop plate 2 which limits the movement of the plate in one direction. The inner ends of these plates or doors are of course engaged with the catches 7 so that the doors are normally extended into position as shown in the drawing. For the purpose of returning the trap doors to their normal positions after they have been swung downwardly under the weight of the animal, suitably designed springs 12 are provided and these cooperate with the under sides of the doors as seen clearly in Figure 2.

Figure 1:
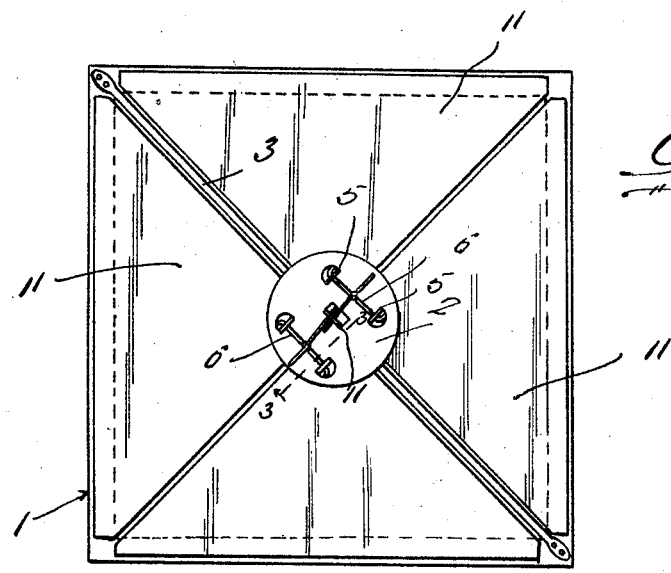

In practice, the frame is placed upon the open top of a receptacle and the receptacle is filled with water into which the animals are to be dropped. Of course, the water may or may not be used as desired. Placing the device in position with the top side up as seen in Figure 1 and placing bait upon the hooks 8, it will be seen that when an animal treads upon one of the trap doors 11 and pulls upon the bait, the hooks will move outwardly and exert a rotating thrust upon the aforesaid shafts 6. As the catches 7 are actuated by the shaft, it is obvious that the two adjacent jaws will simultaneously open and drop the animal into the receptacle. As soon as the animal has slid off of the door and into the receptacle, the spring 12 on the under side of the doors will serve to automatically return the latter to their normal positions and to engage them with the catches 7 again. The elongated bowed springs 9 will serve to return the shafts 6 to their normal positions. Also, the inner ends of the doors striking against the peripheral portion of the discular plate 2 will serve to limit the upward swing of the doors.

It is thought that a consideration of the foregoing description in connection with the drawings will enable persons skilled in the art to which the invention relates to obtain a clear understanding of the same. For this reason a more lengthy description is deemed unnecessary.

Although I have shown and described a specific embodiment of the invention, I wish it to be understood that minor changes coming within the scope of the subjoined claims may be resorted to if desired.

Having thus described the invention, what I claim is:—

1. An animal trap comprising a substantially rectangular frame, a plurality of substantially triangular doors pivotally connected to the side bars of the frame, a discular plate supported at the center of the frame and having its peripheral edge overlying the inner ends of the doors to limit the upward swinging movement thereof, a pair of shafts mounted in bearings upon said plate, said shafts being provided at their outer ends with catches engaging the inner ends of said doors, bait hooks connected with said shafts for rotating them in one direction, spring means connected to the shafts for rotating them in an opposite direction, and spring means cooperating with the doors for automatically returning them to set position after each operation.

2. An animal trap comprising a frame, a plurality of doors pivotally connected to the frame and adapted to be swung downwardly under the action of the animal's weight, a stop plate supported at the center of the frame, the inner ends of the doors being engageable with the under side of the plate, bearings carried by said plate, a pair of shafts rotatably mounted in said bearings, the opposite ends of said shafts being bent to form catches for engaging the inner ends of said doors, bait hooks connected to the intermediate portions of the shafts for rotating them in one direction when a pull is exerted thereon by the animal, bow springs connected with the intermediate portion of the shaft and anchored upon said plate for rotating the shafts in an opposite direction, and spring means cooperating with the under sides of the doors for automatically swinging the latter to set position after each operation.

In testimony whereof I affix my signature.

WILLIAM GILLINGHAM.